Figure 6:
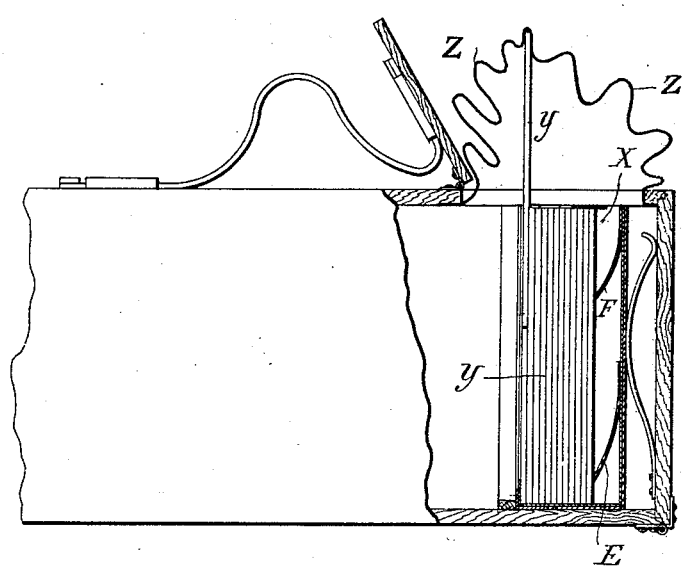

No. 644,392. Patented Feb. 27, 1900.
A. L. ADAMS.
MAGAZINE PLATE HOLDER.
(Application filed June 23, 1899.)
(No Model.) 2 Sheets—Sheet 1.
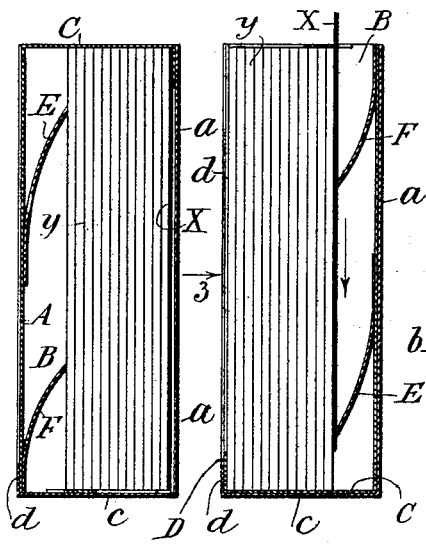
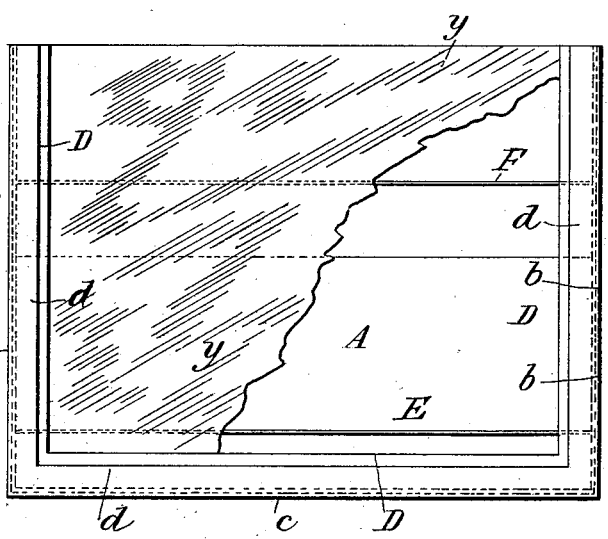
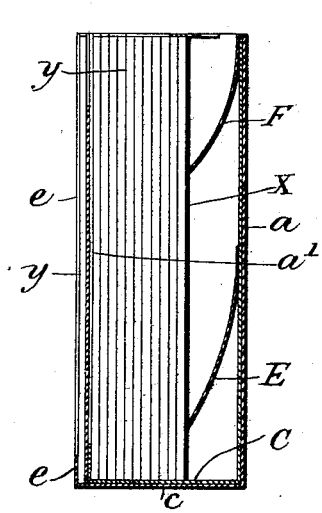
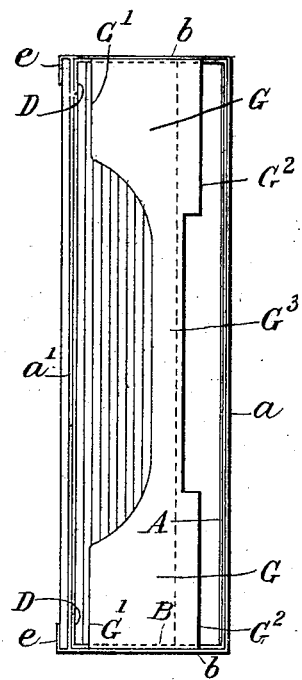
WITNESSES:
INVENTOR
Arthur L. Adams
BY
ATTORNEYS.

No. 644,392. Patented Feb. 27, 1900.
A. L. ADAMS.
MAGAZINE PLATE HOLDER.
(Application filed June 23, 1899.)

(No Model.) 2 Sheets—Sheet 2.

WITNESSES:

INVENTOR
Arthur L. Adams
BY
ATTORNEYS.

UNITED STATES PATENT OFFICE.

ARTHUR LEWIS ADAMS, OF LONDON, ENGLAND.

MAGAZINE PLATE-HOLDER.

SPECIFICATION forming part of Letters Patent No. 644,392, dated February 27, 1900.

Application filed June 23, 1899. Serial No. 721,526. (No model.)

*To all whom it may concern:*

Be it known that I, ARTHUR LEWIS ADAMS, a subject of the Queen of Great Britain, residing in London, England, have invented certain new and useful Improvements in Holders for Photographic Sensitive Surfaces, of which the following is a specification.

This invention is designed with the object of enabling packages of photographic cut films (whether rigid or flexible) or other sensitive surfaces arranged as a pack to be changed in the daylight or otherwise, and primarily relates to apparatus or means for enabling what is known as "daylight" changing to be effected with packages of flat films or sensitive surfaces as distinguished from what are known as "rollable" films—*i. e.*, a length of films wound in a roll, which latter, as is well known, have been arranged so as to be changed in the daylight.

The invention consists of a holder for photographic sensitized surfaces comprising an outer receptacle and an inner receptacle adapted to fit and slide within said outer receptacle and to contain a pack of sensitized surfaces, said inner receptacle being adapted to be removed from and reversed with respect to the outer receptacle and to permit the removal therefrom and replacing therein of the sensitive surfaces for exposing the same in the camera.

The invention consists, further, in certain details of construction, which will be more fully described hereinafter and finally pointed out in the claims.

In the accompanying drawings, Figure 1 is a vertical central section of my improved holder in closed position. Fig. 2 is a similar view showing the holder in open position for exposure. Fig. 3 is a front view in the direction of the arrow 3 in Fig. 2, partly broken away. Fig. 4 is a vertical section of a slightly-modified construction, and Fig. 5 is a top view of the holder shown in Fig. 4.

Similar letters of reference indicate corresponding parts.

Referring to the drawings, my improved holder for photographic sensitive surfaces consists, essentially, of two parts or box-like receptacles, one of said receptacles being adapted to fit accurately and to slide within the other. The inner box-like receptacle contains a pack of sensitive surfaces, such as sensitized glass plates or flat films, and slides within the outer receptacle. Each receptacle is preferably made of thin sheet metal or other suitable light-tight material. The outer receptacle consists of a complete back $a$ of rectangular form, (see Fig. 3,) rather larger than the sensitive surfaces to be changed therein, and has at right angles thereto two vertical sides $b$ in parallel planes opposite to one another and a bottom piece $c$. Said side pieces $b$ and bottom piece $c$ are equal to or slightly greater than the depth from front to back of the inner receptacle of the holder which contains the sensitive surfaces. At the front edge said two sides and bottom piece are turned over or provided with a rabbet or inwardly-projecting edge or rim $d$. Between the rabbet or inwardly-projecting rim $d$ and the back $a$ the inner receptacle A B C D, containing the sensitive surfaces, is adapted to fit and slide freely.

The inner part or receptacle of my improved holder is formed as a counterpart to the outer receptacle $a\ b\ c\ d$ just described, only of slightly smaller dimensions, so as to be adapted to slide within said outer part $a\ b\ c\ d$—*i. e.*, this inner part consists of a front rectangular plate A, with two vertical sides B at right angles thereto, a top C, and rabbet or inwardly-projecting edge or rim D upon said two sides B and top C. Thus an opening is formed surrounded by the rabbet or edge $d$ in the front face of the outer part and a corresponding opening surrounded by the rabbet or edge D in the back of the inner receptacle. The top of the outer receptacle is left quite open; but the bottom of the inner part is not left quite open. By placing the partly-open bottom of the inner receptacle A B C D with the face A of the latter adjacent to the back $a$ of the outer receptacle and then sliding these two receptacles together it will be seen that the pack or series of sensitive surfaces $y$, arranged in said inner receptacle, will then be completely inclosed, so that the holder may be inserted into or withdrawn from any suitable photographic camera or changing-box adapted for use therewith in the daylight. Having inserted said pack of sensitive surfaces contained in my improved holder into a camera or changing-box adapted for the purpose—i. e., a camera or changing-box provided with a light-tight bag of flexible material adapted to permit the operator to grasp through the same the sensitive surfaces, such, for instance, as a camera with a light-tight bag of the character illustrated in Fig. 6, indicated by the letter z—care being taken to insert said holder with the rabbets d of the outer receptacle facing toward the lens, and having closed the camera-shutter, the operator then through the medium of the light-tight bag z grasps the inner receptacle A B C D and slides said inner receptacle (together with the pack of films therein) out of the outer case or receptacle a b c d and then as soon as the inner receptacle is clear of the outer receptacle turns said inner receptacle upside down and reinserts the same within the outer receptacle A B C D into coincidence with the open face or front of the outer receptacle that is opposite the lens, as shown in Figs. 2 and 3, while the front plate A of the inner receptacle now lies next to and close against the back plate a of the outer receptacle, the front one of the pack of sensitive surfaces being now brought up to register and in position for taking a photograph. The photograph having been taken or when it is desired to change the front sensitive surface, the said front sensitive surface is grasped by the operator (through the medium of the light-tight bag z) and raised out of the inner receptacle and then inserted again therein at the back of the pack—that is, between the back of the pack and the springs E F, fixed to the inside of the plate A, the object of said springs being to keep the whole pack of films pressed forward against the rabbet D, and thus the next sensitive surface of the pack is brought up to register ready for exposure. The operation described is repeated until all the sensitive surfaces are exposed.

In order to prevent more than one sensitive surface being raised at a time, the construction of the receptacles may be slightly modified by the employment of a holding-down device G, (shown in plan view in Fig. 5,) the ends of said device G being of such a width as to permit but one sensitive surface to pass between the edge G' thereof and the rabbet D, and also allowing said sensitive surfaces to be passed freely into the inner part between the edge G² and the plate A, as shown in Fig. 5, while the central part G³ is narrowed and serves as a handle, by which the operator can (through the medium of the light-tight bag) grip and raise the inner receptacle in this position until clear of the outer receptacle, said inner receptacle being then reversed and slid again into the outer receptacle, the pack of sensitive surfaces being now again inclosed in a light-tight manner, so that they can now be removed from the camera even in the daylight without injury.

In the construction shown in Figs. 4 and 5 the inner receptacle A B C D of the case is constructed as already described, while the outer receptacle is constructed with a complete front plate a' similar to the back plate a, thus forming a complete inclosing box open only along the top side opposite the bottom c. On the outside of this front plate a' I arrange a rabbet e down the two vertical sides and along the bottom edge, so that after the receptacles of the holder have been reversed into the positions shown in Figs. 4 and 5 the front sensitive surface can then be lifted out of the inner receptacle (through the medium of the light-tight bag) and inserted in the rabbet e on the front of the front plate a' of the outer receptacle, in which position the plate will be ready for exposure. After exposure the sensitive surface is withdrawn out of the rabbet e and inserted at the back of the pack in the inner receptacle and then another sensitive surface taken from the front of the pack and placed in the rabbet e, and so on, a special advantage of this arrangement being that the plate a' of the outer receptacle thus acts as a backing to the sensitive surface, which latter need not, therefore, be provided with any sheath or light-tight backing unless desired, inasmuch as said plate a' will prevent the light when the exposure takes place from reaching the rest of the pack.

As an additional means of preventing any possibility of light reaching the sensitive surfaces in the holder I may provide a dummy plate or light-shield x or surface of any suitable material through which it is impossible for light to pass—for instance, a metal plate X—such plate being of the same size and shape as the sensitive surfaces in the pack, so that by placing this dummy plate X at the front of the pack next to the rabbet D, against which latter the same will be forced by the action of the springs E F, all light will be excluded at all points except along one edge adjacent to the top piece G—i. e., the edge along which there is no rabbet—said dummy plate being of course removed (after the holder has been placed in the camera and "reversed," as aforesaid) and inserted at the back of the pack, and thus the front sensitized surface is made ready for exposure, and in due course when all the sensitized surfaces in the pack have been changed the dummy plate will consequently now again have come around into position in the front of the pack, where it remains, while the inner receptacle of the holder is reversed, and the holder can then be withdrawn from the camera in daylight.

Having thus described my invention, I claim as new and desire to secure by Letters Patent—

1. A holder or light-tight case for holding a pack or series of flat sensitized surfaces for photographic purposes, consisting of an outer receptacle, and an inner receptacle adapted to fit and slide within said outer receptacle and to contain a pack of sensitized surfaces, said inner receptacle being removable from and adapted to be reversed and replaced in reversed position in said outer receptacle, substantially as set forth.

2. A holder or light-tight case for holding a pack or series of flat sensitized surfaces for photographic purposes, consisting of an outer receptacle, and an inner receptacle adapted to fit and slide within said outer receptacle and to contain a pack of sensitized surfaces, said inner receptacle being removable from and adapted to be replaced in reversed position in said outer receptacle, and means for pressing said sensitized surfaces toward a side of said inner receptacle, substantially as set forth.

3. A holder or light-tight case for holding a pack or series of flat sensitized surfaces for photographic purposes, consisting of an inner receptacle adapted to admit the sensitized surfaces thereto and permit their withdrawal therefrom, and having a permanently-closed side parallel with said surfaces and an open side also parallel with said surfaces, a rabbet or rim at said open side for retaining the sensitized surfaces in the receptacle, means for pressing the sensitized surfaces toward the open side, and an outer receptacle provided with a permanently-closed side adapted to close the open side of the inner receptacle, said inner receptacle being removable from said outer receptacle and adapted to be inserted into the outer receptacle either with its open side opposed to said closed side of the outer receptacle or in reversed position therein, substantially as set forth.

4. A holder or light-tight case for holding a pack or series of flat sensitized surfaces for photographic purposes, consisting of an inner receptacle adapted to admit the sensitized surfaces thereto and permit their withdrawal therefrom, and having a permanently-closed side parallel with said surfaces and an open side also parallel with said surfaces, a rabbet or rim at said open side for retaining the sensitized surfaces in the receptacle, means for pressing the sensitized surfaces toward the open side, and an outer receptacle provided with a permanently-closed side adapted to close the open side of the inner receptacle, said inner receptacle being removable from said outer receptacle and adapted to be inserted into the same either with its open side opposed to said closed side of the outer receptacle, or in reversed position therein, said outer receptacle being provided at one side with a rabbet adapted to support one of said sensitized surfaces at the outside of the outer receptacle and opposite a closed side of the same, substantially as set forth.

ARTHUR LEWIS ADAMS.

Witnesses:
A. NUTTING,
H. D. JAMESON.